United States Patent [19]

Takamatsu et al.

[11] Patent Number: 5,318,830
[45] Date of Patent: Jun. 7, 1994

[54] GLASS PANE WITH REFLECTANCE REDUCING COATING

[75] Inventors: Atsushi Takamatsu; Kensuke Makita, both of Mie, Japan

[73] Assignee: Central Glass Company, Limited, Ube, Japan

[21] Appl. No.: 872,033

[22] Filed: Apr. 23, 1992

[30] Foreign Application Priority Data

May 29, 1991 [JP] Japan .................. 3-126223
May 31, 1991 [JP] Japan .................. 3-129713

[51] Int. Cl.$^5$ .................................. G02B 1/100
[52] U.S. Cl. ...................... 428/216; 359/359; 359/586; 359/589; 428/212; 428/336; 428/426; 428/432; 428/697; 428/701; 428/437; 428/702; 428/913
[58] Field of Search ............... 428/212, 216, 336, 426, 428/428, 432, 697, 701, 702, 437; 359/359, 586, 589

[56] References Cited

U.S. PATENT DOCUMENTS

| | | |
|---|---|---|
| 2,466,119 | 4/1949 | Moulton et al. |
| 3,712,711 | 1/1973 | Adadic .................... 428/336 |
| 3,934,961 | 1/1976 | Itoh et al. .................. 428/432 |
| 4,556,599 | 12/1985 | Sato et al. .................. 428/432 |
| 4,940,636 | 7/1990 | Brock et al. ................. 428/701 |
| 5,073,451 | 12/1991 | Iida et al. .................... 428/212 |
| 5,110,637 | 5/1992 | Ando et al. .................. 428/428 |

FOREIGN PATENT DOCUMENTS

| | | |
|---|---|---|
| 0209728 | of 0000 | European Pat. Off. |
| 0410952 | of 0000 | European Pat. Off. |
| 2293719 | of 0000 | France . |
| 61-189501A | 8/1986 | Japan . |
| 64-70701A | 3/1989 | Japan . |
| 3-17601A | 1/1991 | Japan . |
| 1466640 | of 0000 | United Kingdom . |

Primary Examiner—A. A. Turner
Attorney, Agent, or Firm—Keck, Mahin & Cate

[57] ABSTRACT

The invention relates to a transparent coating on a transparent glass pane which may be a laminated glass pane such as an automobile windshield. The invention provides a two-layer coating made up of a first oxide film, e.g. a $TiO_2$-$SiO_2$ mixed oxide film, which is in contact with the glass pane and has a thickness of 70–100 nm and a refractive index of 1.80–1.90 and an outer second oxide film, e.g. a $SiO_2$ film, which has a thickness of 110–130 nm and a refractive index of 1.40–1.50. With respect to visible light obliquely incident on the coating side of the glass pane at an angle of 50–70 degrees with the normal, the reflectance of the coated glass pane becomes lower than that of the glass pane without coating by 4.5–6.5%. To reduce the reflectance of perpendicularly incident light the two-layer coating can be modified into a three-layer coating by interposing another oxide film, e.g. a $TiO_2$ film, having a thickness of 130–160 nm and a refractive index of 2.05–2.30 between the above described first and second oxide films. The three-layer coating is nearly equivalent to the two-layer coating in the ability to reduce the reflectance of obliquely incident light.

15 Claims, 1 Drawing Sheet

GLASS PANE WITH REFLECTANCE REDUCING COATING

BACKGROUND OF THE INVENTION

This invention relates to a transparent glass pane having a reflectance reducing coating which is a laminate of a plurality of oxide films. In particular the glass pane is to be used as a vehicular window glass that is installed in an inclined position as in the case of a current automobile windshield, and the coating is for reducing reflectance of visible light obliquely incident on the coated side of the glass pane.

There are various proposals of antireflection coatings for preventing or reducing the reflection of visible light from vehicular window glasses or windshields.

As a coating for the antireflection purpose it is known to use a fluoride film and/or a laminate of a plurality of transparent oxide films which have different refractive indices. For example, JP 61-189501 A (1986) shows a three-layer coating made up of a first layer which is in contact with the glass surface and formed of $Al_2O_3$ or $CeF_3$ having a refractive index of 1.60–1.80, a second layer formed of a $ZrO_2/TiO_2$ mixture having a refractive index of 1.95–2.15 and a third layer which is formed of $MgF_2$ and has a refractive index of 1.30–1.45. JP 64-70701 A (1989) shows an antireflection three-layer coating which is electrically conductive and consists of a metal film coated on the glass surface as the first layer, a second layer which is a metal oxide film having a refractive index of 1.90–2.50 such as a $TiO_2$ film and a third layer which has a refractive index of 1.35–1.50 and is formed of either $SiO_2$ or $MgF_2$. As a modified way of using a fluoride, JP 3-17601 A (1991) proposes to form an antireflection coating by applying a solution of a metal oxide precursor such as a silicon alkoxide to a glass surface, heating the sol film on the glass surface to convert it into a gel film and further heating the gel film in a fluorine containing atmosphere to thereby form a metal oxide film containing fluoride of the metal.

However, for vehicular window glasses, fluoride containing coatings are generally insufficient in durability, and the use of fluorine or a fluoride often offers inconvenience to the industrial manufacturing operations.

Besides, in the present invention an important matter of concern is the angle of incidence of visible light on a glass pane. In devising conventional anti-reflection coatings, attention is mostly paid to the reflection of perpendicularly or nearly perpendicularly incident light. However, in general the reflection reducing effect of a coating depends on the angle of incidence and greatly lowers when incident light makes an angle larger than about 50 degrees with the normal to the coated glass surface.

In the current automobiles, by way of example, it is prevailing to install the windshield in a steeply inclined position, and hence it is not rarely that the driver is irritated by the reflection of the dashboard in the windshield. Such a reflection phenomenon is unfavorable for the safety of driving.

SUMMARY OF THE INVENTION

It is an object of the present invention to provide a transparent glass pane having a reflectance reducing coating which is good in transparency and sufficiently high in durability for use in automobiles or other vehicles and has the ability to adequately reduce the reflection of visible light obliquely incident on the coated side of the glass pane.

The present invention provides a coated glass pane comprising a transparent glass substrate and a reflectance reducing coating formed on a major surface of the glass pane, the reflectance reducing coating comprising a first layer which is a transparent oxide film in direct contact with the major surface of the glass substrate and has a thickness of 70–100 nm and a refractive index in the range from 1.80 to 1.90, and a second layer which is a transparent oxide film formed on the first layer and has a thickness of 110–130 nm and a refractive index in the range from 1.40 to 1.50. The reflectance reducing coating is constructed such that, with respect to visible light incident on the coating from the coated side of the glass pane at an incidence angle in the range from 50 to 70 degrees, the reflectance of the coated glass pane is lower than the reflectance of the glass substrate without coating by 4.5 to 6.5%.

The two-layer coating according to the invention is simple in construction and uses no fluoride. For visible light the transmittance of this coating can be made 70% or above. The coating itself is colorless or almost colorless. Therefore, when the coated glass pane is used as a vehicular windshield or window glass the coating does not give an unpleasant or strange impression to persons on or outside the vehicle. The glass substrate may use a color glass sheet and may be a laminated glass pane.

In the present invention particular attention is paid to the incidence of visible light from the coated side of the glass pane at an angle of 50°–70° with a normal to the glass pane. This is in consideration of a fact that in many of the current automobiles the windshield makes an angle of about 40°–20° with a horizontal plane so that light emitted from the dashboard is liable to impinge on the inside of the windshield at an incidence angle of about 50°–70°. Since the coating according to the invention reduces the reflectance of the windshield for such obliquely incident visible light by 4.5–6.5%, the reflection of the dashboard in the windshield becomes almost inappreciable to the driver or the occupant of the next seat. This is very favorable for the safety of driving and also for the comfort of the passengers. In the current automobiles the dashboard usually has a blackish or very dark color sometimes with embossing finish. When the present invention is used in an automobile windshield it will be free to give a light color to the dashboard, and a widened selection of the dashboard finishing material will be possible.

The present invention includes modifying the above described two-layer coating to a three-layer coating by interposing another transparent oxide film, which has a thickness of 130–160 nm and a refractive index in the range from 2.05 to 2.30, between the first and second layers of the two-layer coating.

The three-layer coating according to the invention is nearly equivalent to the two-layer coating in both the transmittance for visible light and the ability to reduce the reflection of obliquely incident visible light, and the three-layer coating is superior to the two-layer coating in the ability to reduce the reflection of perpendicularly or nearly perpendicularly incident light.

DESCRIPTION OF THE PREFERRED EMBODIMENTS

Figure 1:
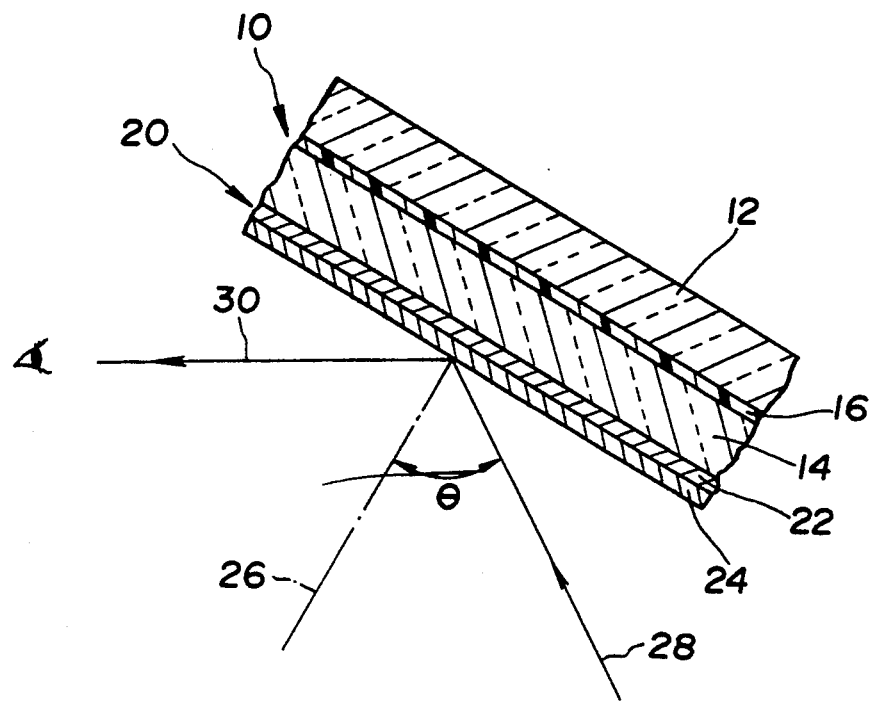
FIG. 1 is a fragmentary and explanatorily enlarged sectional view of a laminated glass pane having a two-layer coating according to the invention.

FIG. 1 shows a reflectance reducing coating 20 according to the invention on a laminated glass pane 10 which is made by sandwiching a transparent plastic interlayer 16 between two transparent glass sheets 12 and 14. The coating 20 is also transparent. Assuming that the laminated glass pane 10 is an automobile windshield, the coating 20 is formed on the inboard side of the windshield.

The laminated glass pane 10 in FIG. 1 is merely by way of example. Alternatively a pane of a glass sheet can be employed, and it is also optional to apply this invention to an insulated glass panel. This invention is always applied to a transparent glass pane, but the glass pane is not necessarily colorless. The glass pane may use a color glass such as, for example, bluish, greenish, grayish, bronzy or golden glass, and the color glass may be an ultraviolet and/or infrared absorbing glass. It is optional to use a tempered or partly tempered glass sheet. It is also possible to use an organic glass. Irrespective of the type of the glass, either a flat glass pane or a curved glass pane can be used. Besides the coating 20 according to the invention, another coating (not shown) may optionally be formed on the opposite side of the glass pane 10.

The reflectance reducing coating 20 is made up of a first oxide layer 22 formed directly on the surface of the glass sheet 14 and a second oxide layer 24 laid on the first layer 22. The first oxide layer 22 is 70 to 100 nm in thickness and has a refractive index in the range from 1.80 to 1.90. The second oxide layer 24 is 110 to 130 nm in thickness and has a refractive index in the range from 1.40 to 1.50. With such specific and strict limitations on the thicknesses and refractivities of the respective layers 22, 24 the two-layer coating 20 can adequately reduce reflectance of visible light rays that are obliquely incident on the coating side of the coated glass pane 10. With this coating 20 the glass pane is sufficiently high, i.e. at least 70%, in transmittance for visible light. In the following description the term "light" refers to visible light unless noted otherwise.

In FIG. 1, line 26 is a normal to the glass pane 10 having the coating 20. The matter of particular concern is the reflection of light incident on the coated side of the glass pane 10 at an angle ($\theta$) ranging from 50° to 70°. If the glass pane 10 makes an angle of about 30° with a horizontal plane and if the angle of incidence $\theta$ of incident light 28 is about 60° the direction of reflected light 30 becomes nearly horizontal. When the inclined glass pane 10 is an automobile windshield the obliquely incident light 28 originates from the dashboard, and the nearly horizontal propagation of the reflected light 30 means that the reflection of the dashboard in the windshield comes into the view of the driver or the occupant of the next seat. When the angle of incidence $\theta$ is in the range from 50° to 70° the coating 20 serves the purpose of reducing reflectance to such an extent that the reflectance of the coated glass pane is lower than that of the glass pane 10 itself (without coating) by 4.5–6.5%. By such a reduction in the reflectance the reflection of the dashboard in the windshield becomes almost inappreciable to the driver and the occupant of the next seat. With this coating 20 the amount of reduction in the reflectance depends on the angle $\theta$ of incident light 28 and gradually increases as the angle $\theta$ becomes greater.

As to the material of the first layer 22 of the coating 20, it is suitable to use a mixed oxide which is a combination of at least one of $TiO_2$ and $ZrO_2$, which are relatively high in refractivity, and at least one of $SiO_2$, $Al_2O_3$ and $B_2O_3$ which are relatively low in refractivity. $TiO_2$ has a refractive index of about 2.25, and $ZrO_2$ about 1.95. $SiO_2$ has a refractive index of about 1.45, $Al_2O_3$ about 1.65 and $B_2O_3$ about 1.60. Therefore, it is easy to choose a combination suitable for forming a mixed oxide film having a refractive index in the range from 1.80 to 1.90, and in almost every case the mixed oxide film is very good in durability. Preferably the first layer 22 is formed of a mixed oxide of $TiO_2$ and $SiO_2$, and in this case it is suitable that the molar ratio of $TiO_2$ to $SiO_2$ is in the range from 55:45 to 62:38. This combination is the best in respect of the reflectance reducing effect of the coating 20 and provides a film excellent in durability. Furthermore, in forming the film 22 by the sol-gel process using an alkoxide solution it is easy to prepare a stable and easily applicable solution of a titanium alkoxide and a silicon alkoxide, and hence a uniform film can easily be formed.

As to the second layer 24 of the coating 20 it is preferred to employ $SiO_2$ as the sole material of this layer in view of the value of refractive index and the ease of forming into a uniform and durable film.

Figure 2:
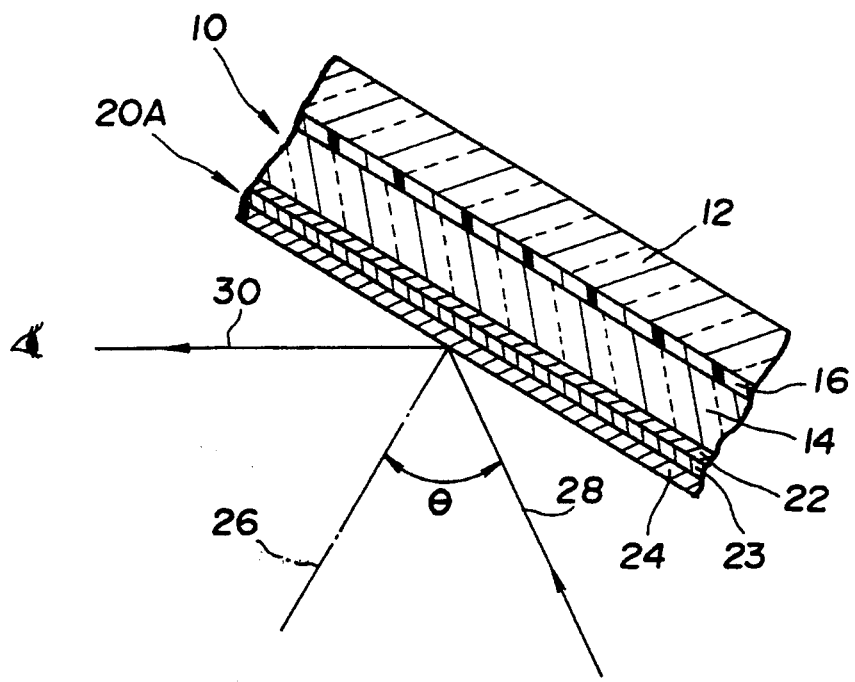
FIG. 2 is a similar sectional view of a laminated glass pane having a three-layer coating according to the invention.

FIG. 2 shows another reflectance reducing coating 20A according to the invention on a laminated glass pane 10. This coating 20A is made up of three oxide layers 22, 23 and 24. The first oxide layer 22, which is formed directly on the glass sheet 14 of the glass pane 10, is 70–100 nm in thickness and has a refractive index in the range from 1.80 to 1.90. The second oxide layer 23, which is the middle layer, is 130–160 nm in thickness and has a refractive index in the range from 2.05 to 2.30. The third oxide layer 24, which is the outermost layer, is 110–130 nm in thickness and has a refractive index in the range from 1.40 to 1.50.

In the three-layer coating 20A in FIG. 2 the first layer 22 is identical with the first layer 22 of the two-layer coating 20 in FIG. 1, and the third layer 24 of the three-layer coating 20A is identical with the second layer 24 of the two-layer coating 20. That is, the construction of the three-layer coating 20A can be regarded as the addition of the intermediate layer 23 to the two-layer coating 20 of FIG. 1. With respect to obliquely incident light 28 at an angle $\theta$ ranging from 50° to 70° with the normal, the reflectance reducing performance of the three-layer coating 20A is nearly equivalent to that of the two-layer coating 20. However, the incorporation of the intermediate layer 23 has the effect of reducing the reflectance of light incident normal or nearly normal to the coating 20A and, besides, reducing the reflectance of light reflected at an angle smaller than the angle of incidence. With the three-layer coating 20A the visible light transmittance of the glass pane is still 70% or above.

In the three-layer coating 20A, it is suitable that the first layer 22 is formed of a mixed oxide of at least one of $TiO_2$ and $ZrO_2$ and at least one of $SiO_2$, $Al_2O_3$ and $B_2O_3$, and it is preferred to employ $TiO_2$-$SiO_2$ mixed oxide in which the molar ratio of $TiO_2$ to $SiO_2$ is in the range from 55:45 to 62:38. The reasons are as described with respect to the first layer 22 of the two-layer coating 20. It is preferred to use $SiO_2$ as the material of the third layer 24 similarly to the second layer 24 of the two-layer coating 20.

As the material of the second or middle layer 23, it is suitable to use $Ta_2O_5$ (refractive index: about 2.05) or $TiO_2$, or a combination of $Ta_2O_5$ and $TiO_2$, or a combination of at least one of $Ta_2O_5$ and $TiO_2$ and at least one of $SiO_2$, $ZrO_2$, $Al_2O_3$ and $B_2O_3$. By any of these options the second layer 23 becomes good in adhesion to the first and third layers 22 and 24, and the three-layer coating 20A becomes very good in durability. By using a combination of at least two kinds of metal oxides different in refractivity it is easy to desirably adjust the refractive index of the second layer 23.

Usually it is favorable to form each layer of a two- or three-layer coating according to the invention by the sol-gel process using an alkoxide solution.

The following nonlimitative examples are illustrative of the present invention.

EXAMPLE 1

This example relates to a two-layer coating according to the invention on a laminated glass pane to be used as an automobile windshield. In advance of producing the laminated glass pane 10 shown in FIG. 1, the coating 20 was formed on the transparent glass sheet 14 which becomes the inside of the windshield.

A mixed alkoxide solution was prepared by mixing titanium methoxide and silicon methoxide in the proportion of 58 to 42 by mol and dissolving the mixture in isopropyl alcohol. In the solution the concentration of the total methoxide was adjusted to about 0.45 mol/l, and the viscosity of the solution was adjusted to about 2 cP. The outside surface of the glass sheet 14 was covered with masking tape, and the glass sheet 14 was immersed in the mixed alkoxide solution and drawn up from the solution at a rate of about 3 mm/sec. Then the masking tape was removed, and the glass sheet 14 was heated at a temperature of about 270° C. for about 10 min to thereby convert the mixed alkoxide sol film on the inside surface into a gel film. After that the uncoated outside of the glass sheet 14 was again covered with masking tape, and the glass sheet 14 was immersed in an alcohol solution of silicon methoxide. The concentration of this solution was about 0.25 mol/l, and the viscosity was about 7 cP. The glass sheet 14 was drawn up from the solution at a rate of about 4 mm/sec. Then the masking tape was removed, and the glass sheet 14 was heated at a temperature of about 270° C. for about 10 min to thereby convert the silicon alkoxide sol film on the precedingly gelled film into a gel film. After that the glass sheet 14 was placed in a furnace and bent into a predetermined curved shape at a temperature of about 620° C. By this heating for bending, the laminate of two gel films on the inside of the glass sheet 14 turned into a laminate of two dense and hard oxide films, viz. the first and second oxide layers 22 and 24 in FIG. 1. By the usual laminating operation using a polyvinyl butyral film as the interlayer 16, the coated and bent glass sheet 14 was laminated with another transparent and similarly bent glass sheet (12) to obtain the laminated glass pane 10 having the two-layer coating 20.

In this example the first layer 22 of the two-layer coating 20 was a $TiO_2$-$SiO_2$ mixed oxide film which was about 82 nm in thickness and had a refractive index of 1.85. The second layer 24 was a $SiO_2$ film which was about 124 nm in thickness and had a refractive index of 1.45. With respect to the reflection of visible light incident on the coating side of the coated glass pane 10 at an angle $\theta$ of 65° with the normal, this coating 20 proved to be capable of reducing the reflectance by about 6%. That is, without the coating 20 the reflectance of the glass pane 10 was about 21.7%, and with the coating 20 the reflectance became about 15.7%.

EXAMPLE 2

The process of Example 1 was modified only in respect of the mixed oxide composition of the first layer 22 of the coating 20.

In this example zirconium methoxide and silicon methoxide were mixed in the proportion of 90 to 10 by mol, and the mixture was dissolved in a mixed solvent which was prepared by first mixing 1 part by volume of n-butanol with 1 part by volume of isopropanol and then mixing 2 parts by volume of the mixed alcohol with 1 part by volume of ethyl cellosolve (ethylen glycol monoethyl ether). In the solution the concentration of the total alkoxide was adjusted to about 0.4 mol/l. A very small amount of 0.2N aqueous solution of nitric acid was added, and the solution was stirred to obtain a uniformly mixed alkoxide solution having a viscosity of about 3 cP. Using this solution at the first stage, the two-stage coating and heating process of Example 1 was repeated. After that the heat bending of the glass sheets 12, 14 and the lamination of the bent glass sheets were carried out in the same manner as in Example 1.

In the two-layer coating 20 of this example the first layer 22 was a $ZrO_2$-$SiO_2$ mixed oxide film which was about 81 nm in thickness and had a refractive index of 1.90. The second layer 24 was a $SiO_2$ film which was about 120 nm in thickness and had a refractive index of 1.45. The coating 20 was very hard and excellent in chemical resistance. With respect to the reflection of visible light incident on the inside of the laminated glass pane 10 at an angle $\theta$ of 61° with the normal, the reflectance of the coated glass pane was about 12.7%. Without the coating the reflectance of the glass pane 10 was about 17.6%. That is, with the coating 20 the reflectance was reduced by about 5%.

COMPARATIVE EXAMPLE 1

A conventional low reflection coating for eye glasses was made on the laminated lass pane 10 employed in the above examples. That is, a film of $MgF_2$ having a thickness of about 130 nm was formed by a PVD method on the inside glass sheet 14 of the laminated glass pane 10. The $MgF_2$ had a refractive index of about 1.38.

On the $MgF_2$ coating side of the coated glass pane, when the angle of incidence $\theta$ of visible light was 65° the reflectance was about 17.9%. Since the reflectance of the uncoated glass pane 10 was about 21.7%, the $MgF_2$ coating reduced the reflectance by only about 3.8%. The $MgF_2$ coating was inferior in durability to the oxide coatings of Examples 1 and 2.

COMPARATIVE EXAMPLE 2

A two-layer coating was made on the inside glass sheet 14 of the laminated glass pane 10 employed in Examples 1 and 2. First, a $TiO_2$-$SiO_2$ mixed oxide film was formed on the glass sheet 14 by a sputtering method. The mixed oxide film was about 20 nm in thickness and had a refractive index of about 1.90. Next, a $MgF_2$ film was formed on the $TiO_2$-$SiO_2$ film. The $MgF_2$ film was about 120 nm in thickness and had a refractive index of about 1.39. On the coating side of the coated glass pane, when the angle of incidence $\theta$ of visible light was 61° the reflectance was about 14.4%.

Since the reflectance of the uncoated glass pane 10 was about 17.6%, the two-layer coating reduced the reflectance by only about 3.2%. This two-layer coating was inferior in durability to the oxide coatings of Examples 1 and 2.

EXAMPLE 3

This example relates to a three-layer coating according to the invention on a laminated glass pane to be used as an automobile windshield. In advance of producing the laminated glass pane 10 shown in FIG. 2, the three-layer coating 20A was formed on the glass sheet 14 which becomes the inside of the windshield.

A mixed alkoxide solution was prepared by mixing titanium methoxide and silicon methoxide in the proportion of 58 to 42 by mol and dissolving the mixture in isopropyl alcohol. In the solution the concentration of the total methoxide was adjusted to about 0.45 mol/1, and the viscosity of the solution was adjusted to about 2 cP. The glass sheet 14 was transparent and colorless and had a thickness of 2 mm. The outside surface of the glass sheet 14 was covered with masking tape, and the glass sheet 14 was immersed in the mixed alkoxide solution and drawn up from the solution at a rate of about 3.5 mm/sec. Then the masking tape was removed, and the glass sheet 14 was heated at a temperature of about 270° C. for about 10 min to thereby convert the mixed alkoxide sol film on the inside surface into a gel film. After that the uncoated outside of the glass sheet 14 was again covered with masking tape, and the glass sheet was immersed in an alcohol solution of titanium methoxide. The concen-tration of this solution was about 0.5 mol/1, and the viscosity was about 2 cP. The glass sheet was drawn up from the titanium methoxide solution at a rate of about 7 mm/sec and, after removing the masking tape, heated at a temperature of about 270° C. for about 10 min to thereby convert the titanium methoxide sol film on the precedingly gelled film into a gel film. After that the uncoated outside of the glass sheet 14 was again covered with masking tape, and the glass sheet was immersed in an alcohol solution of silicon methoxide. The concentration of this solution was about 0.25 mol/1, and the viscosity was about 7 cP. The glass sheet was drawn up from the silicon methoxide solution at a rate of about 4 mm/sec and, after removing the masking tape, heated at a temperature of about 270° C. for about 10 min to thereby convert the silicon methoxide sol film into a gel film. After that the glass sheet 14 was placed in a furnace and bent into a predetermined curved shape at a temperature of about 620° C. By this heating for bending, the laminate of three gel films on the inside of the glass sheet 14 turned into a laminate of three dense and hard oxide films, viz. the first, second and third layers 22, 23, 24 in FIG. 2. By the usual laminating operation using a polyvinyl butyral film (16) the coated and bent glass sheet 14 was laminated with another similarly bent glass sheet (12) to obtain the laminated glass pane 10 having the three-layer coating 20A. The outside glass sheet 12 was a transparent and bronzy glass sheet having a thickness of 2.3 mm.

In this example the first layer 22 of the three-layer coating 20A was a $TiO_2$-$SiO_2$ mixed oxide film which was about 90 nm in thickness and had a refractive index of 1.85. The second or middle layer 23 was a $TiO_2$ film which was about 160 nm in thickness and had a refractive index of 2.20. The third layer 24 was a $SiO_2$ film which was about 120 nm in thickness and had a refractive index of 1.45. With respect to the reflection of visible light obliquely incident on the coating side of the coated glass pane, the three-layer coating 20A of this example proved to be capable of reducing the reflectance by about 5.5% when the angle of incidence $\theta$ was about 60°.

EXAMPLE 4

The process of Example 3 was modified only in the following points.

The inside glass sheet 14 of the laminated glass pane 10 was a transparent and bronzy color glass sheet having a thickness of 2 mm. The outside glass sheet 12 was a transparent and colorless glass sheet having a thickness of 2 mm.

To form the first layer 22 of the three-layer coating 20A, a mixed solution of zirconium methoxide and silicon methoxide was used. The molar ratio of zirconium methoxide to silicon methoxide was 85 to 15. The solvent was the same mixture of n-butanol, isopropanol and ethyl cellosolve as in Example 22. In the solution the cocentration of the total methoxide was about 0.4 mol/1. A very small amount of 0.2N aqueous solution of nitric acid was added, and the solution was stirred to obtain a uniform solution having a viscosity of about 3 cP. With masking tape on the outside surface, the glass sheet 14 was immersed in this solution and drawn up from the solution at a rate of about 2.5 mm/sec. After that the operations in Example 3 were repeated.

In the three-layer coating 20A of this example the first layer 22 was a $ZrO_2$-$SiO_2$ mixed oxide film which was about 85 nm in thickness and had a refractive index of 1.85. The second layer 23 was a $TiO_2$ film which was about 140 nm in thickness and had a refractive index of 2.25. The third layer 24 was a $SiO_2$ film which was about 125 nm in thickness and had a refractive index of 1.45. This coating 20A was very hard and excellent in chemical resistance. With respect to the reflection of visible light incident on the coating side of the coated glass pane 10 at an incidence angle $\theta$ of about 65°, the three-layer coating 20A proved to be capable of reducing the reflectance by about 6.5%.

COMPARATIVE EXAMPLE 3

A three-layer oxide coating not in accordance with the present invention was formed by sputtering operations on the inside glass sheet 14 of the laminated glass pane 10 employed in Example 3.

In the three-layer coating the first layer on the surface of the glass sheet 14 was a $TiO_2$-$SiO_2$ mixed oxide film which had a thickness of about 65 nm and a refractive index of about 1.85. The second or middle layer was a $TiO_2$ film which had a thickness of about 60 nm and a refractive index of about 2.05. The third layer was a $SiO_2$ film which had a thickness of about 96 nm and a refractive index of about 1.45. With respect to the reflection of visible light incident on the coating side of the coated glass pane at an incidence angle $\theta$ of about 60°, this three-layer coating reduced the reflectance by only about 3.8%.

COMPARATIVE EXAMPLE 4

Another three-layer coating not in accordance with the invention was formed by vacuum deposition operations on the inside glass sheet 14 of the laminated glass pane 10 employed in Example 4.

In this three-layer coating the first layer on the surface of the glass sheet 14 was a $ZrO_2$-$SiO_2$ mixed oxide film which had a thickness of about 81 nm and a refractive index of about 1.70. The second or middle layer was a TiO$_2$-SiO$_2$ mixed oxide film which had a thickness of about 134 nm and a refractive index of about 2.05. The third layer was a MgF$_2$ film which had a thickness of about 100 nm and a refractive index of about 1.38. With respect to the reflection of visible light incident on the coating side of the coated glass pane at an incidence angle $\theta$ of about 65°, this three-layer coating reduced the reflectance by only about 4.3%. This three-layer coating was inferior in durability to the three-layer coatings of Examples 3 and 4.

What is claimed is:

1. A coated glass pane, comprising a transparent glass substrate and a reflectance reducing coating formed on a major surface of the glass substrate, the reflectance reducing coating being a two-layer coating comprising:

a first layer which is a transparent oxide film in direct contact with said major surface of said substrate and has a thickness of 70–100 nm and a refractive index in the range from 1.80 to 1.90, and a second layer which is a transparent oxide film formed on said first layer and has a thickness of 110–130 nm and a refractive index in the range from 1.40 to 1.50, said coating being constructed such that, with respect to visible light incident on said coating from the coated side of the coated glass pane at an incidence angle in the range from 50 to 70 degrees, the reflectance of the coated glass pane is lower than the reflectance of said glass substrate without coating by 4.5 to 6.5%;

wherein said first layer of said coating is a mixed oxide film comprising at least one relatively high refractivity oxide selected from the group consisting of TiO$_2$ and ZrO$_2$ and at least one relatively low refractivity oxide selected from the group consisting of SiO$_2$, Al$_2$O$_3$ and B$_2$O$_3$; and wherein said second layer of said coating is a SiO$_2$ film.

2. A coated glass pane according to claim 1, wherein said first layer of said coating is a binary oxide film formed of TiO$_2$ and SiO$_2$.

3. A coated glass pane according to claim 2, wherein the molar ratio of said TiO$_2$ to said SiO$_2$ in said first layer is in the range from 55:45 to 62:38.

4. A coated glass pane according to claim 1, wherein said glass substrate comprises a color glass sheet.

5. A coated glass pane according to claim 1, wherein said glass substrate is a laminated glass pane.

6. A coated glass pane, comprising a transparent glass substrate and a reflectance reducing coating formed on a major surface of the glass substrate, the reflectance reducing coating being a three-layer coating comprising:

a first layer which is a transparent oxide film in direct contact with said major surface of said substrate and has a thickness of 70–100 nm and a refractive index in the range from 1.80 to 1.90, a second layer which is a transparent oxide formed on said first layer and has a thickness of 130–160 nm and a refractive index in the range from 2.05 to 2.30, and a third layer which is a transparent oxide film formed on said second layer and has a thickness of 110–130 nm and a refractive index in the range from 1.40 to 1.50, said coating being constructed such that, with respect to visible light incident on said coating from the coated side of the coated glass pane at an incidence angle in the range from 50 to 70 degrees, the reflectance of the coated glass pane is lower than the reflectance of said glass substrate without coating by 4.5 to 6.5%;

wherein said first layer of said coating is a mixed oxide film comprising at least one relatively high refractivity oxide selected from the group consisting of TiO$_2$ and ZrO$_2$ and at least one relatively low refractivity oxide selected from the group consisting of SiO$_2$, Al$_2$O$_3$ and B$_2$O$_3$;

wherein said second layer of coating is a film comprising at least one member selected from the group consisting of TiO$_2$, Ta$_2$O$_5$, and a combination of at least one member selected from the group consisting of TiO$_2$ and Ta$_2$O$_5$ and at least one member selected from the group consisting of SiO$_2$, ZrO$_2$, Al$_2$O$_3$ and B$_2$O$_3$; and wherein said third layer of said coating is a SiO$_2$ film.

7. A coated glass pane according to claim 6, wherein said glass substrate comprises a color glass sheet.

8. A coated glass pane according to claim 6, wherein said glass substrate is a laminated glass pane.

9. A coated glass pane, comprising a transparent glass substrate and a reflectance reducing coating formed on a major surface of the glass substrate, the reflectance reducing coating being a three-layer coating comprising:

a first layer which is a transparent oxide film in direct contact with said major surface of said substrate and has a thickness of 70–100 nm and a refractive index in the range from 1.80 to 1.90, a second layer which is a transparent oxide film formed on said first layer and has a thickness of 130–160 nm and a refractive index in the range from 2.05 to 2.30, and a third layer which is a transparent oxide film formed on said second layer and has a thickness of 110–130 nm and a refractive index in the range from 1.40 to 1.50, said coating being constructed such that, with respect to visible light incident on said coating from the coated side of the coated glass pane at an incidence angle in the range from 50 to 70 degrees, the reflectance of the coated glass pane is lower than the reflectance of said glass substrate without coating by 4.5 to 6.5%, wherein said first layer of said coating is a mixed oxide film comprising at least one relatively high refractivity oxide selected from the group consisting of TiO$_2$ and ZrO$_2$ and at least one relatively low refractivity oxide selected from the group consisting of SiO$_2$, Al$_2$O$_3$ and B$_2$O$_3$; and said second layer of said coating is a film comprising at least one member selected from the group consisting of TiO$_2$, Ta$_2$O$_5$, and a combination of at least one member selected from the group consisting of TiO$_2$ and Ta$_2$O$_5$ and at least one member selected from the group consisting of SiO$_2$, ZrO$_2$, Al$_2$O$_3$ and B$_2$O$_3$.

10. A coated glass pane according to claim 9, wherein said first layer of said coating is a binary oxide film formed of TiO$_2$ and SiO$_2$.

11. A coated glass pane according to claim 10, wherein the molar ratio of said TiO$_2$ to said SiO$_2$ in said first layer is in the range from 55:45 to 62:38.

12. A coated glass pane according to claim 9, wherein said second layer of said coating is a TiO$_2$ film.

13. A coated glass pane according to claim 9, wherein said second layer of said coating is a $Ta_2O_5$ film.

14. A coated glass pane according to claim 9, wherein said second layer of said coating is a binary oxide film formed of $TiO_2$ and $Ta_2O_5$.

15. A coated glass pane according to claim 9, wherein said second layer of said coating is a mixed oxide film comprising at least one relatively high refractivity oxide selected from the group consisting of $TiO_2$ and $Ta_2O_5$ and at least one relatively low refractivity oxide selected from the group consisting of $SiO_2$, $ZrO_2$, $Al_2O_3$ and $B_2O_3$.

* * * * *